United States Patent [19]

Bienert et al.

[11] 4,272,125
[45] Jun. 9, 1981

[54] VEHICLE ROOF

[75] Inventors: Horst Bienert, Gauting; Richard Igel, Germering; Johann Rengstl, Munich, all of Fed. Rep. of Germany

[73] Assignee: Webasto-Werk W. Baier GmbH & Co., Stuttgart, Fed. Rep. of Germany

[21] Appl. No.: 5,234

[22] Filed: Jan. 22, 1979

[30] Foreign Application Priority Data

Jan. 20, 1978 [DE] Fed. Rep. of Germany ... 7801538[U]

[51] Int. Cl.³ .............................................. B60J 7/04
[52] U.S. Cl. .................................................. 296/223
[58] Field of Search ........... 296/137 G, 137 E, 137 F, 296/137 H, 137 B, 137 A, 223, 216, 219, 220, 222, 224

[56] References Cited

U.S. PATENT DOCUMENTS

| 2,774,624 | 12/1956 | Lower | 296/137 G |
|---|---|---|---|
| 2,985,483 | 5/1961 | Bishop et al. | 296/223 X |
| 3,031,226 | 4/1962 | Larche | 296/223 X |
| 3,266,328 | 8/1966 | Rott | 296/223 X |
| 3,964,784 | 6/1976 | Prechter et al. | 296/137 G X |
| 4,039,222 | 8/1977 | Wolf et al. | 296/137 E |
| 4,056,274 | 11/1977 | Jardin et al. | 296/137 G |
| 4,081,926 | 4/1978 | Jardin | 296/223 X |
| 4,113,304 | 9/1978 | Leiter | 296/223 X |

FOREIGN PATENT DOCUMENTS 986225 3/1965 United Kingdom ............... 296/137 G

Primary Examiner—Randolph A. Reese
Assistant Examiner—Norman L. Stack, Jr.
Attorney, Agent, or Firm—Craig and Antonelli

[57] ABSTRACT

A drive arrangement for opening and closing a cover for an aperture in a vehicle roof via an electric motor acting upon an incompressible cable via an intermediate drive and drive pinion. In accordance with a preferred embodiment, the electric motor is substitutable for a crank operated drive while avoiding limited available space associated problems by disposing an intermediate drive in a drive housing to which the electric motor is flanged to form a module which has the shape of a V as viewed from above, one leg of said V being formed by the electric motor and being disposed at right angles to the lengthwise axis of the vehicle, and the other leg of the V containing the intermediate drive and drive pinion.

8 Claims, 2 Drawing Figures

VEHICLE ROOF

BACKGROUND AND SUMMARY OF THE INVENTION

The invention relates to a vehicle roof with a roof opening delimited by a rain gutter, said opening being closable by a cover, said cover being movable by an electric motor through an incompressible cable, said motor being mounted in the vehicle roof in front of the leading edge of the roof opening and driving a pinion engaging the cable through an intermediate drive, said pinion being disposed on the inside of the rain gutter inside wall, facing the roof opening, on the lengthwise axis of the vehicle.

The arrangement of the electric motor at this point in front of the leading edge of the roof opening has certain advantages over mounting it at another position, since electric drives usually are provided as an optional additional feature instead of a conventional manually actuated, crank operated drive, and since the crank drive must be provided on the lengthwise axis of the vehicle in the vicinity of the leading edge of the roof opening, so as to be comfortably accessible to both the driver and the front-seat passenger, by locating the electric drive at the same point, the largest possible number of identical parts can be used for both drive systems. However, owing to the limited available space, problems arise in conjunction with so installing the electric motor and the intermediate drive. These problems are especially serious when the vehicle roof is covered on the inside by a headlining, particularly a headlining of the type that is provided with depressions to accept sun-visors for the driver and front-seat passenger in front of the roof opening, as is frequently the case in modern vehicles.

Therefore, a primary object of the invention is to provide an electric drive of the type described hereinabove which is characterized by having a small space requirement. This object is achieved according to the invention by virtue of the fact that the intermediate drive is disposed in a drive housing, to which housing the electric motor is flanged to form a module which has the shape of a "V" as viewed from above, one leg of said "V" being formed by the electric motor and being disposed at right angles to the lengthwise axis of the vehicle, and the other leg of the "V" containing the intermediate drive and supporting the pinion.

This design makes it possible to make the length of the electric drive, which extends at right angles to the lengthwise axis of the vehicle, sufficiently short that it fits between the depressions which are provided for accepting the sun visors, and to mount the drive pinion on the lengthwise axis of the vehicle, despite the fact that the point of engagement between the motor shaft and the intermediate drive is necessarily located laterally outside the lengthwise axis of the vehicle.

According to a preferred embodiment, the motor shaft is drivably connected with a shaft of the intermediate drive, said connection extending outward through the drive housing and being provided with a gear at its projecting end, said gear meshing with a switch wheel cooperating with switch contacts. This embodiment is advantageous in that it integrates the electrical switching to control the electric motor, i.e., to shut off the latter in the end positions, in the module. The switch contacts, which are usually in the form of micro-switches, are located on the outside of the drive housing and are therefore readily accessible.

These and further objects, features and advantages of the present invention will become obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
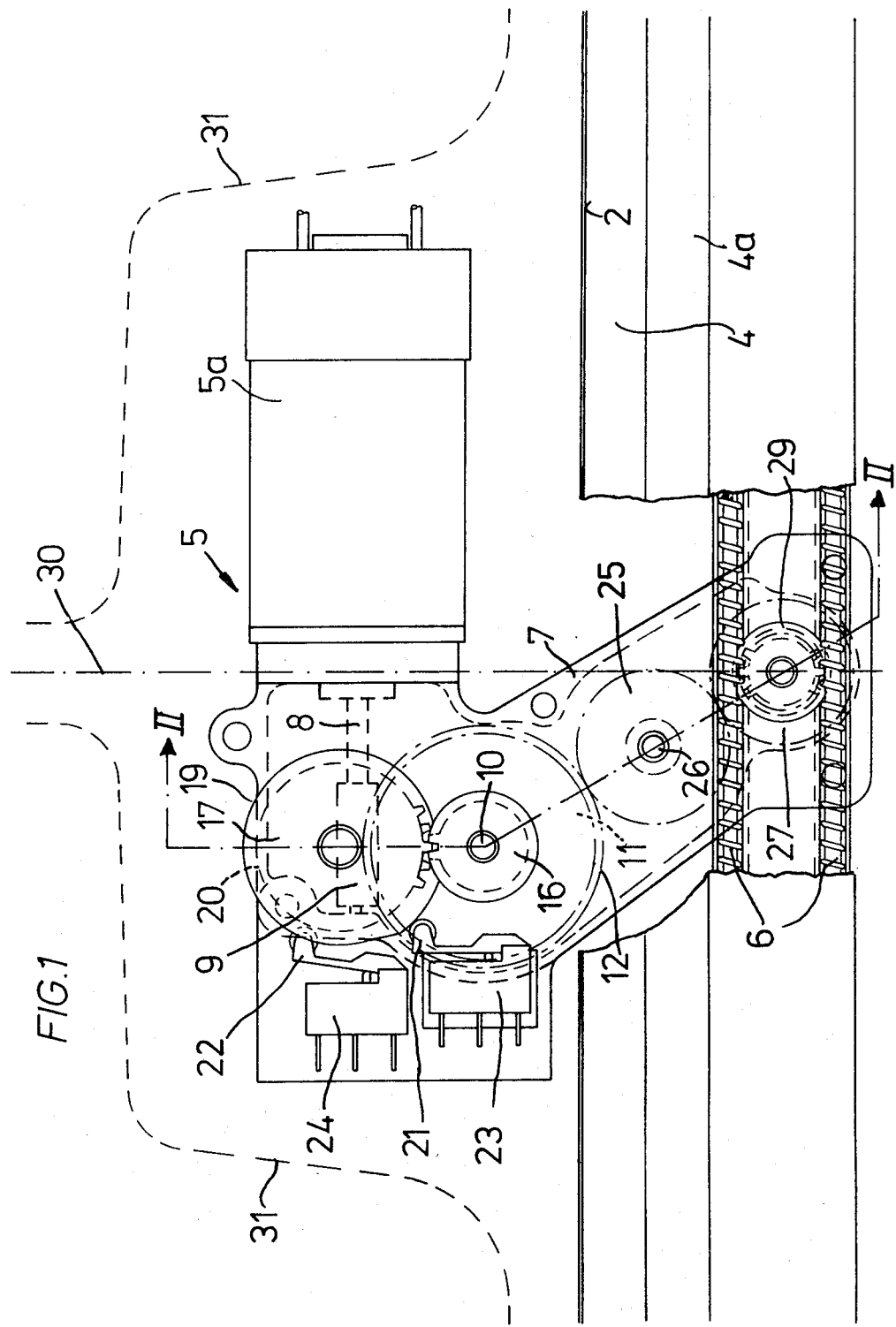
FIG. 1 is a cross section along line I—I in FIG. 2 through a vehicle roof in the vicinity of the leading edge of the roof opening, whereby individual parts are shown cut away in order to render the electric drive visible in a top view.

Reference numeral 1 designates the solid part of a vehicle roof, having a roof opening 2 closable by a slidable and tiltable cover 3. Roof opening 2 is surrounded by a rain gutter 4. Cover 3 can be moved out of roof opening 2 and back into the latter by a drive unit 5 through one or more incompressible cables 6. Drive unit 5 comprises an electric motor 5a, flanged to a drive housing 7. Motor shaft 8, which projects into drive housing 7, is provided with a worm 9 meshing with a gear 11 mounted loosely on a shaft 10. A gear 12, pressed against gear 11 by a spring 13 through a washer 12a and forming a frictional connection with this gear 11 as a result of the frictional coupling thus formed, is connected nonrotatably to shaft 10 by axially displaceably with respect to said shaft. The tension on spring 13 can be adjusted by a nut 14 through a sleeve 15. Shaft 10 extends outward from drive housing 7 and has a gear 16 at its outer end, said gear meshing with a switch wheel 17. Switch wheel 17 is rotatably mounted on an axis 18 molded into drive housing 7. It has two cam surfaces 19 and 20, which cooperate with contact arms 21 and 22 of microswitches 23 and 24, said switches turning off electric motor 5a in the fully open positions and in the closed position of cover 3. Gears 16 and 17 are designed as stepping gears, like those conventionally used in tachometer drives, in order to produce the desired large gear ratio. As FIG. 1 shows, gear 16 has only two teeth with a space between them, so that wheel 17 is advanced only one tooth for each revolution of gear 16.

Figure 2:
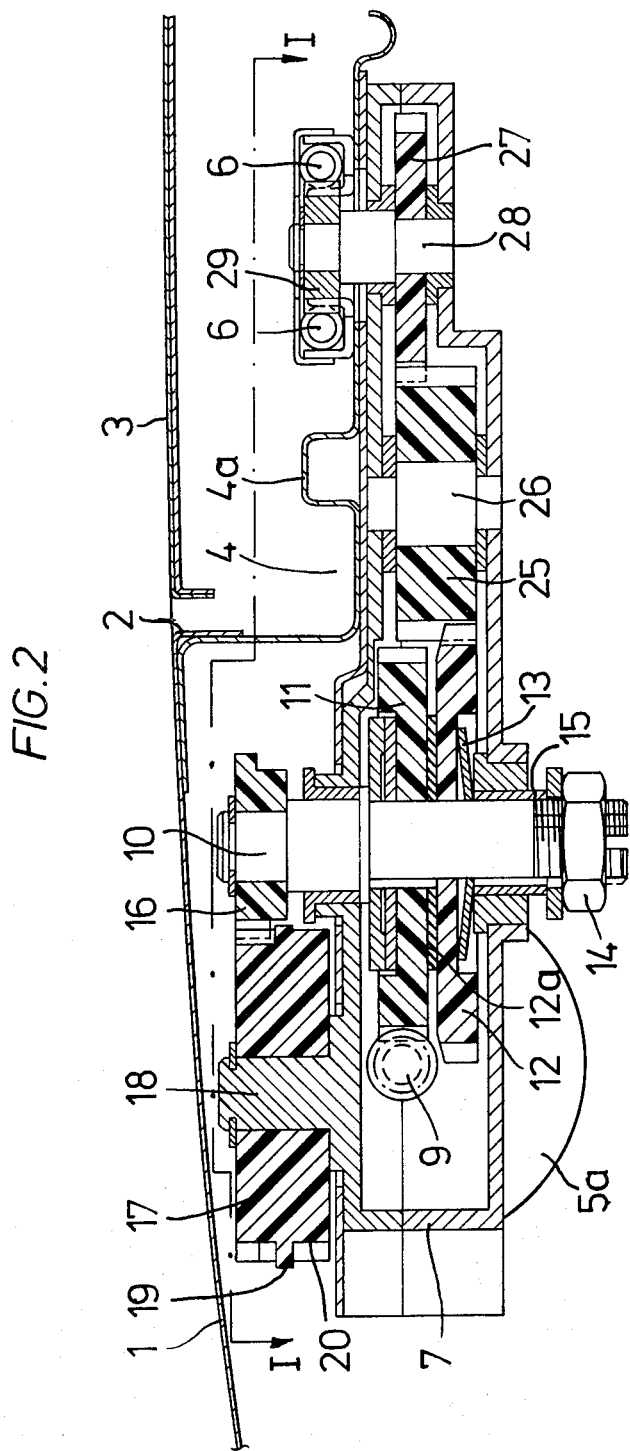
FIG. 2 is a cross section along line II—II in FIG. 1.

Gear 12 meshes with an intermediate gear 25. The gear 25 is mounted rotatably on an axis 26 which is immovably mounted on drive housing 7, in turn, meshes with a gear 27. The gear 27 is immovably mounted on shaft 28 which extends out of drive housing 7 and is also provided with a pinion 29 at its outer end. The pinion 29 meshes with incompressible cable 6 and, as FIG. 2 shows, is disposed on the inner side rain gutter inside wall 4a, facing the open roof opening, on the lengthwise axis of the vehicle 30.

Vehicle roof 1 is covered on the inside by a headlining that is not shown beyond the extent of the depressions 31, indicated by the dashed lines in FIG. 1, for accepting sun visors for the driver and front-seat passenter, the depressions being located forward of the roof opening 2 in the vehicle longitudinal direction. As FIG. 1 indicates, the drive unit 5 is disposed between these depressions 31. Drive unit 5 has the general shape of a "V" when viewed from above (FIG. 1), with electric motor 5a forming one leg of this "V" and being disposed at right angles to the lengthwise axis of the vehicle 30, while the other leg of the "V" is formed by the drive housing 7 and the intermediate drive, consisting of gears 12, 25, and 27 and drive pinion 29. This design makes it possible to mount drive unit 5, despite the very limited available space, between depressions 31 for the sun visors, and also to mount drive pinion 29 on the lengthwise axis of the vehicle 30 so that no design changes must be made as far as the location of the drive pinion is concerned, which is different from that used for a manually operated crank drive.

We claim:

1. An electric motor drive arrangement for use in place of a manually operated crank drive of a movable closure panel for opening and closing an opening in a vehicle body member of the type having a drive pinion located on a central longitudinal axis of the vehicle body opening and in the vicinity of a leading edge thereof, said drive arrangement comprising:
 (a) an intermediate drive connected to said drive pinion and disposed in a drive housing; and
 (b) an electric motor flanged to said drive housing to form a module and drivingly connected to said intermediate drive, said module being generally V-shaped when viewed from above, one leg of said V-shape comprising said electric motor and being disposed at a right angle with respect to said longitudinal axis and the other leg of said V-shape being formed by said intermediate drive and drive housing, said other leg having a longitudinal axis that extends at an angle relative to said central longitudinal axis, whereby said arrangement is able to fit into conventional vehicle body configurations including those having limited available space longitudinally of said leading edge and laterally of said longitudinal axis, such as those having depressions for acceptance of sun visors.

2. A drive arrangement according to claim 1, wherein said opening is a roof opening and said closure panel is a roof member, wherein said drive arrangement further comprises an incompressible cable connected to said closure panel and meshing with said pinion, said pinion being located on the inner side of an inner wall of a rain gutter surrounding said roof opening in the vicinity of a leading edge thereof, wherein the longitudinal axis of the opening corresponds to the longitudinal axis of the vehicle, and wherein said electric motor is located forwardly, in the vehicle longitudinal direction, of said leading edge.

3. A drive arrangement according to claim 2, wherein said roof has a headlining provided with two depressions to accept sun visors for the driver and front-seat passenger, said depressions being located forwardly of the roof opening in the vehicle longitudinal direction of the roof opening, wherein the module or the leg thereof formed by the electric motor is disposed between the depressions for the sun visors.

4. A drive arrangement for a moveable closure panel according to claims 1 or 2 or 3, wherein the motor is provided with a motor shaft, said motor shaft being drivably connected with a shaft of the intermediate drive, said shaft of the intermediate drive extending outward through the drive housing and being provided at its outer end with a gear, said gear meshing with a switch wheel that cooperates with switch contacts for stopping said electric motor is open and closed positions of said closure panel.

5. In a vehicle panel assembly of the type having a vehicle body member having an opening therein, said body member being of a size and/or configuration providing limited available space for receiving a drive arrangement, a closure panel mounted to said body member for movement between first and second positions blocking and unblocking said body member opening, a drive pinion located on a central longitudinal axis of the vehicle body opening in the vicinity of a leading edge thereof, and a drive arrangement for acting on said drive pinion to displace said panel between said first and second positions, the improvement in said drive arrangement for facilitating reception of said drive arrangement in a motorized form within said limited space comprising:
 (a) an intermediate drive connected to said drive pinion and disposed in a drive housing; and
 (b) an electric motor flanged to said drive housing to form a module and drivingly connected to said intermediate drive, said module being generally V-shaped when viewed from above, one leg of said V-shape comprising said electric motor and being disposed at a right angle with respect to said longitudinal axis and the other leg of said V-shape being formed by said intermediate drive and drive housing and said other leg having a longitudinal axis that extends at an acute angle relative to said central longitudinal axis.

6. A drive arrangement according to claim 5, wherein said opening is a roof opening and said closure panel is a roof member, wherein said drive arrangement further comprises an incompressible cable connected to said closure panel and meshing with said pinion, said pinion being located on the inner side of an inner wall of a rain gutter surrounding said roof opening in the vicinity of a leading edge thereof, wherein the longitudinal axis of the opening corresponds to the longitudinal axis of the vehicle, and wherein said electric motor is located forwardly, in the vehicle longitudinal direction, of said leading edge.

7. A drive arrangement according to claim 6, wherein said roof has a headlining provided with two depressions to accept sun visors for the driver and front-seat passenger, said depressions being located forwardly of the roof opening in the vehicle longitudinal direction of the roof opening, wherein the module or the leg thereof formed by the electric motor is disposed between the depressions for the sun visors.

8. A drive arrangement for a moveable closure panel according to claims 5 or 6 or 7, wherein the motor is provided with a motor shaft, said motor shaft being drivably connected with a shaft of the intermediate drive, said shaft of the intermediate drive extending outward through the drive housing and being provided at its outer end with a gear, said gear meshing with a switch wheel that cooperates with switch contacts for stopping said electric motor in open and closed positions of said closure panel.

* * * * *